United States Patent [19]

Sprafke

[11] Patent Number: 5,315,915
[45] Date of Patent: May 31, 1994

[54] PERISCOPE AT THE HATCHWAY OF A COMBAT VEHICLE

[75] Inventor: Uwe Sprafke, Schauenburg-Elmshagen, Fed. Rep. of Germany

[73] Assignee: Firma Wegmann & Co. GmbH, Kassel, Fed. Rep. of Germany

[21] Appl. No.: 439

[22] Filed: Jan. 4, 1993

[30] Foreign Application Priority Data

Jan. 8, 1992 [DE] Fed. Rep. of Germany ....... 4200261

[51] Int. Cl.⁵ .......................... F41H 5/22; F41H 5/26
[52] U.S. Cl. .................. 89/36.14; 89/36.08; 359/402; 359/513
[58] Field of Search ................. 89/36.14, 36.13, 36.08; 359/402, 405, 406, 513, 514

[56] References Cited

U.S. PATENT DOCUMENTS

| 2,130,006 | 9/1938 | Gundlach | 359/405 |
| 2,454,268 | 11/1948 | Brackett | 89/36.14 |
| 3,559,527 | 2/1971 | Schallehn | 89/36.08 |
| 3,724,323 | 4/1973 | Selle | 89/36.14 |

FOREIGN PATENT DOCUMENTS

| 3704776 | 8/1988 | Fed. Rep. of Germany | 89/36.13 |
| 3706302 | 9/1988 | Fed. Rep. of Germany | 89/36.08 |
| 3305882 | 9/1991 | Fed. Rep. of Germany . | |

Primary Examiner—Stephen M. Johnson
Attorney, Agent, or Firm—Sprung Horn Kramer & Woods

[57] ABSTRACT

A periscope at the hatchway of a combat vehicle. The hatchway is closed by a hatch that comprises two components. One component is above the other at least when the hatchway is closed. The upper component is positioned over the upper edge of the hatchway and moves parallel to the plane that the hatch slides back and forth in. The lower component moves perpendicular to that plane. The periscope comprises two sections. The lower section is fastened to the vehicle and extends into its interior. The upper section extends through and slides back and forth along with the upper hatch component. The upper and lower periscope sections remain in optical alignment and contact as long as the upper hatch component is in its hatchway-closing position. A dirt-removal brush is secured to at least an area of the lower surface of the upper hatch component that, as long as that hatch component keeps the hatchway closed, is directly upstream of the periscope in the direction the component slides in when it opens the hatchway. The brush's bristles extend down to the roof of the vehicle perpendicular to the component's hatchway-opening direction at least along the circumference of the lower periscope section at the vehicle's roof.

4 Claims, 2 Drawing Sheets

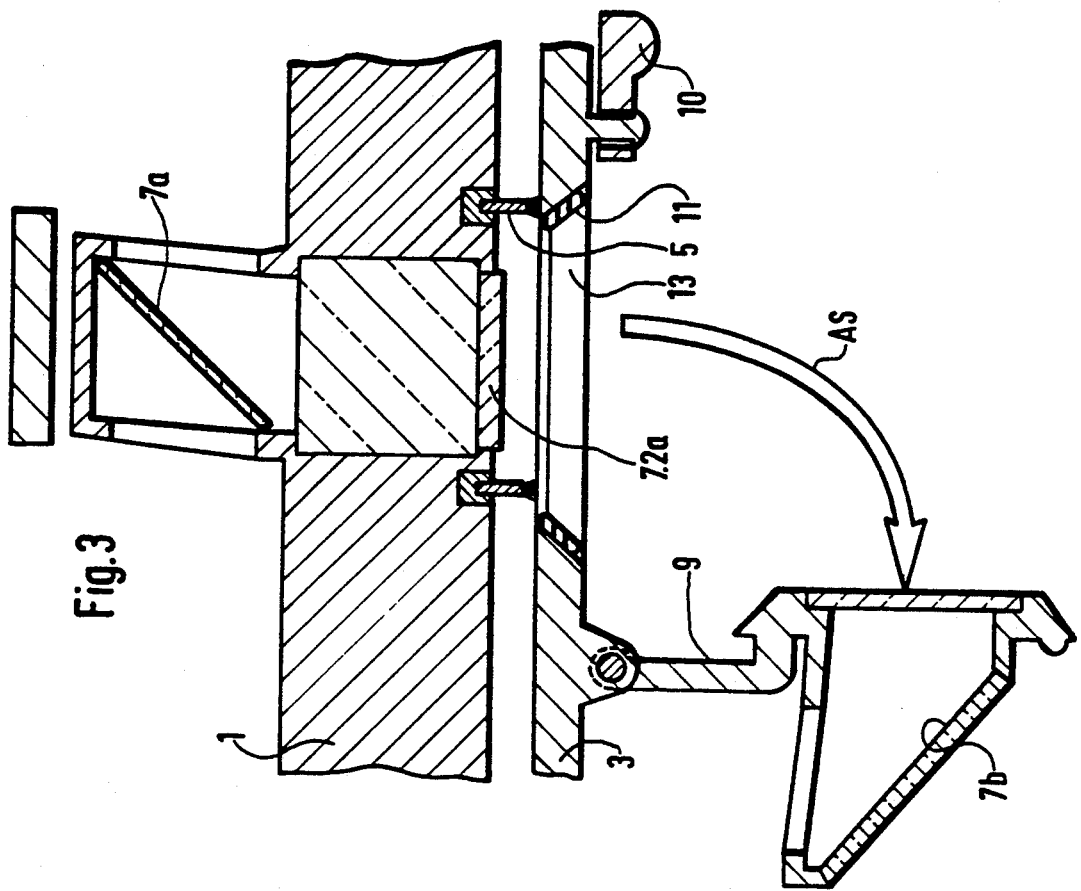
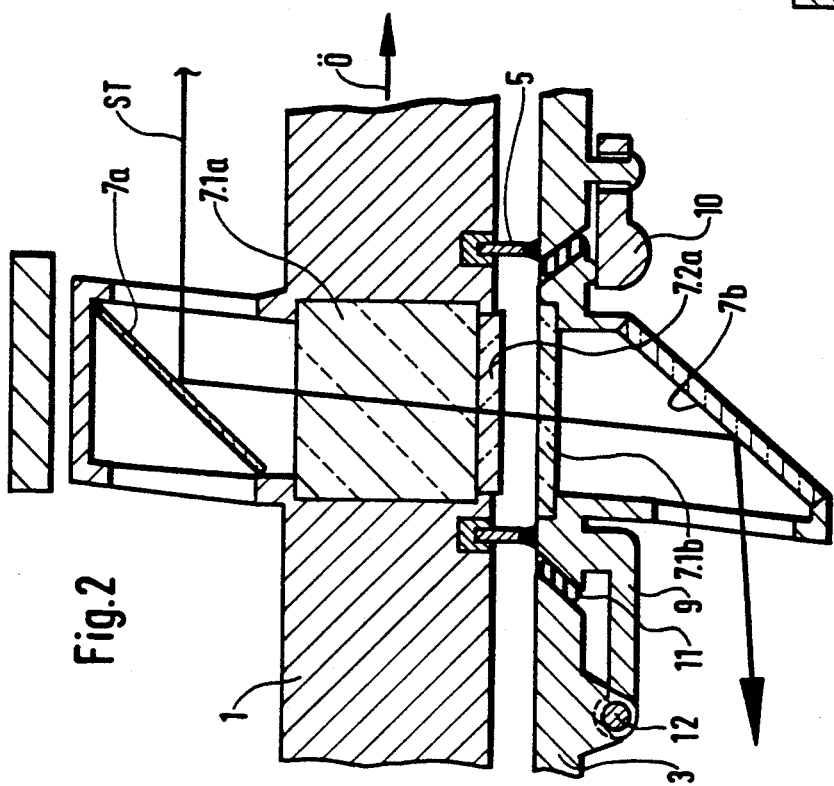

PERISCOPE AT THE HATCHWAY OF A COMBAT VEHICLE

BACKGROUND OF THE INVENTION

The invention concerns a periscope at the hatchway of a combat vehicle. The hatchway is closed by a hatch that comprises two components. One component is above the other at least when the hatchway is closed. The upper component is positioned over the upper edge of the hatchway and moves parallel to the plane that the hatch slides back and forth in. The lower component moves perpendicular to that plane. The periscope comprises two sections. The lower section is fastened to the vehicle and extends into its interior. The upper section extends through and slides back and forth along with the upper hatch component. The upper and lower periscope sections remain in optical alignment and contact as long as the upper hatch component is in its hatchway-closing position.

A periscope of this genus, comprising a lower section fastened to the vehicle and an upper section that slides back and forth with the upper hatch component, is described in German Patent 3 305 882 for example. Two-section periscopes have the disadvantage that dirt can penetrate between the upper and lower sections.

SUMMARY OF THE INVENTION

The object of the present invention is accordingly to improve a periscope of the aforesaid genus to the extent that much less dirt will be able to penetrate between the sections and be much easier to remove.

This object is attained in accordance with the invention by a dirt-removal brush secured to at least an area of the lower surface of the upper hatch component that, as long as that hatch component keeps the hatchway closed, is directly upstream of the periscope in the direction the component slides in when it opens the hatchway, whereby the brush's bristles extend down to the roof of the vehicle perpendicular to the component's hatchway-opening direction at least along the circumference of the lower periscope section at the vehicle's roof. The subsidiary claims address practical advanced embodiments of the invention.

The theory of the invention is to position a brush between the sliding upper hatch component and the roof of the vehicle where it will sweep and effectively remove dirt from the top of the lower periscope section every time the hatch opens the hatchway. It has been demonstrated particularly practical for the brush to be in the shape of a continuous ring that, when the hatchway is closed, seals off the gap between the upper hatch component and the roof of the vehicle, where the upper periscope section faces the lower periscope section, from the environment. The brush will remove dirt only from where it mainly accumulates, the top of the lower periscope section. Since on the other hand it is also useful to remove dirt from the bottom of the upper periscope section as well sometimes, it is practical for the lower periscope section to pivot into the vehicle to provide access through the resulting hole to the bottom of the upper periscope section so that it can be cleaned too. Dirt can be removed from between the brush's bristles at the same time.

One embodiment of a periscope in accordance with the invention will now be specified with reference to the drawings.

BRIEF DESCRIPTION OF THE DRAWINGS

FIG. 2 is a larger-scale vertical section through the vicinity of the periscope with the hatchway closed, and FIG. 3 is a view similar to that in FIG. 2 with the lower periscope section pivoted into the vehicle.

DETAILED DESCRIPTION OF THE INVENTION

Figure 1:
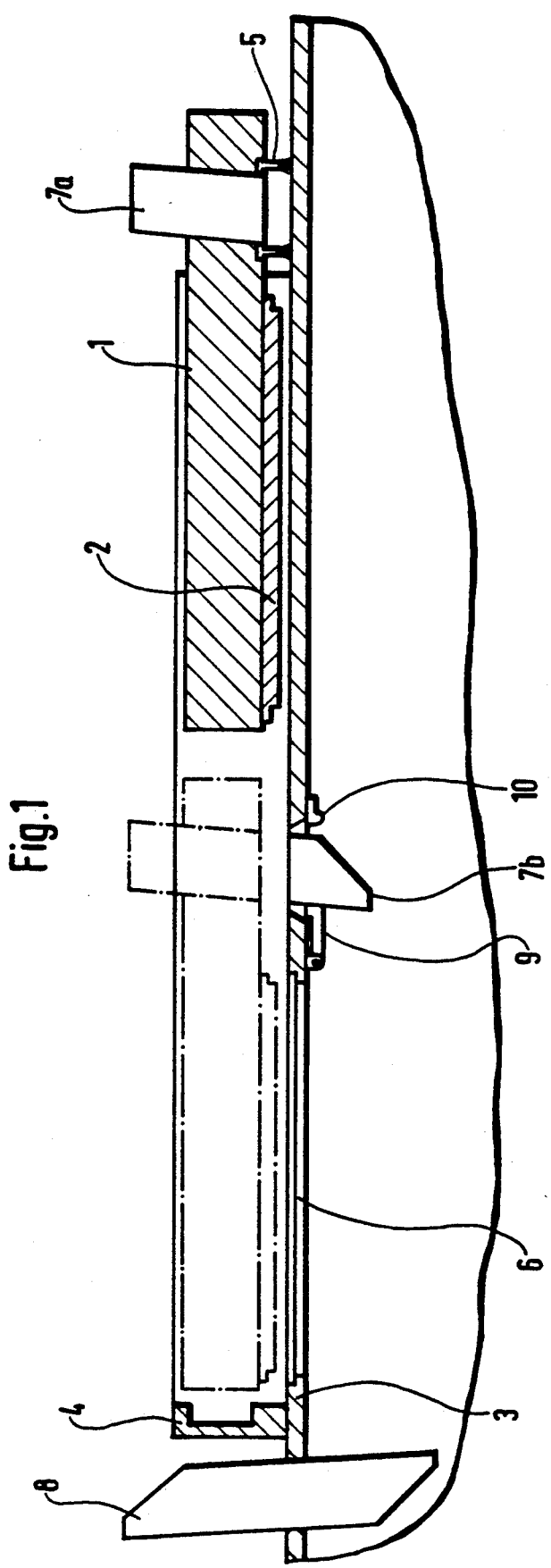
FIG. 1 is a longitudinal vertical section through part of the roof of a combat vehicle with an open hatchway and a periscope in the vicinity of the hatch.

FIG. 1 is a highly schematic illustration of the vicinity of a hatchway 6 in a combat vehicle, a tank for example.

Hatchway 6 extends through the vehicle's armor. The upper component 1 of a hatch slides back and forth above, and on unillustrated rollers along rails 4 at each side of hatchway 6 to open and close it.

Attached to the lower surface of upper hatch component 1 by an unillustrated linkage is a lower hatch component 2 that, in contrast to the upper component, fits tightly into hatchway 6. Lower hatch component 2 can be raised and lowered. To close the hatchway, upper hatch component 1 is slid along the track until lower hatch component 2 is directly above hatchway 6, whereupon the lower component is lowered to where it seals the hatchway tight. To open the hatchway, lower hatch component 2 is raised and slide aside with upper hatch component 1.

Mounted in the vicinity of the hatchway are observing instruments in the form of periscopes. One periscope 8 is an integral unit located outside the path traveled by hatch 1 and 2 as it slides back and forth. Another periscope is positioned along the hatch's route and comprises two sections, a lower section 7b secured to the body of the vehicle and an upper section 7a secured to and sliding along with upper hatch component 1. The upper and lower periscope sections remain in optical alignment and contact as long as the upper hatch component 1 is in its hatchway-closing position. As will be evident from FIG. 2, optical axis ST will in this situation extend through the objective constituted by upper periscope section 7a, through a block 7.1a of optical glass, through a flat disk constituting the bottom 7.2a of upper periscope section 7a, through the gap between the two periscope sections, through another flat disk constituting the top 7.1b of lower periscope section 7b, and through the ocular constituted by the lower section.

The gap between the bottom 7.2a of upper periscope section 7a and the top 7.1b of lower periscope section 7b is surrounded by an annular brush 5 secured to the bottom of the upper section and with its bristles resting against the roof 3 of the vehicle. When upper hatch component 1 slides in the direction indicated by arrow Ö as it opens hatchway 6, brush 5 will sweep the top 7.1b of lower periscope section 7b and remove any dirt resting on it. The same event will occur in the opposite sequence, when the hatchway is closed. Brush 5 also seals off and keeps dirt out of the gap between the two periscope sections and around optical axis ST.

Since dirt can also accumulate on the bottom 7.2a of upper periscope section 7a, access is provided to it from inside the vehicle.

Lower periscope section 7b is for this purpose fastened to a hinge flange 9 that swings around a pivot 12 inside the vehicle as illustrated in FIG. 3. Flange 9 pivots in the direction indicated by arrow AS, exposing an opening 13 that provides access to inside brush 5 and through which the bottom 7.2a of upper periscope section 7a can also be cleaned. Opening 13 also accommodates an annular seal 11 that seals off the gap between the edge of the closed flange 9 and the edge of the opening. Flange 9 is kept closed by a sliding bolt 10.

What is claimed is:

1. In a combat vehicle having a roof with a hatchway, a hatch for closing the hatchway and including a lower component receivable in the hatchway and an upper component for covering an outer edge of the hatchway, means mounting the hatch for sliding movement of the upper component from an open position wherein the hatchway is open to a closed position wherein the upper component is over the hatchway with a gap between a lower surface thereof and the roof and for movement of the lower component towards and away from the hatchway when the upper component is in the closed position and a periscope comprising a lower section, means fastening the lower section to the roof and extending into an interior thereof and an upper section extending through the upper component of the hatch and movable therewith into optical alignment with the lower section when the upper component is in the closed position, the improvement comprising a brush mounted to at least an area on the lower surface of the upper component that directly precedes the upper section in a direction of movement of the upper component in which the upper component moves from the closed position to the open position and wherein the brush has bristles which extend down to the roof perpendicular to the direction of movement of the upper component at least along a circumference of the lower section at the vehicle roof.

2. The combat vehicle according to claim 1, wherein the brush is configured in a shape of a continuous ring which seals off from the environment, the gap between the lower surface of the upper component and the roof where the upper section of the periscope faces the lower section of the periscope.

3. The combat vehicle according to claim 1, wherein the means fastening the lower section comprises means for pivoting the lower section from an operating position in the vehicle roof into the vehicle in a cleaning position.

4. The combat vehicle according to claim 3, wherein the roof has an opening therein and the lower section has a flange for closing the opening when the lower section is in the operating position and a slidable bolt for maintaining the lower section in the operating position.

* * * * *